UNITED STATES PATENT OFFICE.

FRITZ CARL GÜNTHER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

YELLOWISH AZO DYE.

No. 798,098.   Specification of Letters Patent.   Patented Aug. 29, 1905.

Application filed May 22, 1905. Serial No. 261,662.

*To all whom it may concern:*

Be it known that I, FRITZ CARL GÜNTHER, doctor of philosophy and chemist, a subject of the King of Prussia, German Emperor, residing at Ludwigshafen-on-the-Rhine, in the Kingdom of Bavaria, German Empire, have invented new and useful Improvements in Azo Coloring-Matters, of which the following is a specification.

My invention relates to the manufacture of new azo coloring-matters.

I have discovered that by combining 2.6-diamido-1-chlor-benzene-4-sulfo-acid with diazo compounds of the benzene and naphthalene groups new and valuable coloring-matters can be obtained which dye wool from an acid-bath, yielding from pure yellow to reddish-yellow shades which have a bright appearance "overhand" and are also very fast against the action of acids, the said coloring-matters possessing excellent equalizing power. The diazo compounds which I have found to yield especially valuable coloring-matters when combined with 2.6-diamido-1-chlor-benzene-4-sulfo-acid include the diazo compounds of sulfanilic acid, metanilic acid, meta-nitranilin, naphthionic acid, anilin, and 2.1-naphthylamin sulfo-acid.

The coloring-matters which I desire to claim generically are those which can be obtained by combining a diazo compound of the benzene or naphthalene groups with 2.6-diamido-1-chlor-benzene-4-sulfo-acid, and they possess the following properties: They dissolve in water, and the solutions, to which a little sodium carbonate has been added, are from reddish yellow to greenish yellow. When dyed on wool, they produce from reddish-yellow to greenish-yellow shades. Upon reduction with tin and hydrochloric acid they yield 2.3.6-triamido-1-chlor-benzene-4-sulfo-acid.

The coloring-matter which I desire to claim specifically is that which can be obtained by combining diazotized sulfanilic acid with 2.6-diamido-1-chlor-benzene-4-sulfo-acid and which possesses the following properties: It dissolves in water, and the solution, to which a little sodium carbonate has been added, is yellow. The coloring-matter dissolves in dilute hydrochloric acid with a reddish-yellow color and in concentrated sulfuric acid with a brilliant red color. When dyed on wool, it produces yellow shades. Upon reduction with tin and hydrochloric acid it yields sulfanilic acid and 2.3.6-triamido-1-chlor-benzene-4-sulfo-acid.

The following example illustrates a method of obtaining one of the new coloring-matters; but my invention is not confined to this example. The parts are by weight: Diazotize in the usual manner one hundred and seventy-three (173) parts of sulfanilic acid and allow the diazo suspension, which should be free from nitrous acid, to run into a solution of two hundred and twenty-two and a half (222.5) parts of 2.6-diamido-1-chlor-benzene-4-sulfo-acid in the smallest possible quantity of water, to which has been added sufficient sodium carbonate or sodium acetate to neutralize all the free mineral acid in the final mixture. The combination takes place in a short time, and after it has taken place the coloring-matter is precipitated by means of common salt with or without the addition of hydrochloric acid. In a similar manner coloring-matters from diazotized metanilic acid and other diazo compounds of the benzene and naphthalene groups can be obtained.

Now what I claim is—

1. As new articles of manufacture the azo coloring-matters which can be obtained by combining a diazo compound with 2.6-diamido-1-chlor-benzene-4-sulfo-acid, which coloring-matters are soluble in water, and yield from reddish-yellow to greenish-yellow solutions in dilute sodium-carbonate solution, which dye wool reddish-yellow to greenish-yellow shades and which upon reduction with tin and hydrochloric acid yield 2.3.6-triamido-1-chlor-benzene-4-sulfo-acid.

2. As a new article of manufacture the azo coloring-matter which can be obtained by combining diazotized sulfanilic acid with 2.6-diamido-1-chlor-benzene-4-sulfo-acid, which coloring-matter is soluble in water, and which yields a yellow solution in dilute sodium-carbonate solution, a reddish-yellow solution in dilute hydrochloric acid, and a brilliant red solution in concentrated sulfuric acid, and which produces yellow shades when dyed on wool, and which when reduced with tin and hydrochloric acid yields sulfanilic acid and 2.3.6-triamido-1-chlor-benzene-4-sulfo-acid.

In testimony whereof I have hereunto set my hand in the presence of two subscribing witnesses.

FRITZ CARL GÜNTHER.

Witnesses:
J. ALEC. LLOYD,
JOS. H. LEUTE.